United States Patent
Mc Cowin

(10) Patent No.: US 8,048,261 B2
(45) Date of Patent: Nov. 1, 2011

(54) TAPE REMOVAL APPARATUS AND PROCESS FOR USE WITH AN AUTOMATED COMPOSITE TAPE LAYING MACHINE

(75) Inventor: Peter D. Mc Cowin, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 1117 days.

(21) Appl. No.: 11/837,263

(22) Filed: Aug. 10, 2007

(65) Prior Publication Data

US 2009/0038757 A1   Feb. 12, 2009

(51) Int. Cl.
    *B32B 38/10* (2006.01)
(52) U.S. Cl. ........ 156/719; 156/715; 156/716; 156/759; 156/764; 156/765; 156/767
(58) Field of Classification Search ............... 156/344, 156/584, 715, 716, 719, 759, 764, 765, 767
    See application file for complete search history.

(56) References Cited

U.S. PATENT DOCUMENTS

| | | | |
|---|---|---|---|
| 4,561,921 A | 12/1985 | Treiber | |
| 4,584,048 A * | 4/1986 | Hamisch et al. | 156/384 |
| 4,978,417 A | 12/1990 | Grimshaw et al. | |
| 5,024,862 A | 6/1991 | Frank | |
| 5,114,519 A | 5/1992 | Grimshaw et al. | |
| 5,470,420 A | 11/1995 | Yokajty | |
| 5,480,508 A | 1/1996 | Manabe et al. | |
| 5,482,589 A * | 1/1996 | Shin et al. | 156/268 |
| 5,807,460 A * | 9/1998 | Yamamoto | 156/344 |
| 7,326,312 B1 | 2/2008 | Rust et al. | |

FOREIGN PATENT DOCUMENTS

EP   0 593 410   10/1993

OTHER PUBLICATIONS

International Search Report dated Oct. 27, 2008 for PCT application No. PCT/US2008/072505.
U.S. Appl. No. 11/751,504, filed May 21, 2007, Gary Pfitzner and Donald Anderson.
U.S. Appl. No. 11/829,536, filed Jul. 27, 2007, Donald A. Anderson, et al.
U.S. Appl. No. 11/829,525, filed Jul. 27, 2007, Thomas J. Hagman.

* cited by examiner

*Primary Examiner* — Mark A Osele
*Assistant Examiner* — Nickolas Harm
(74) *Attorney, Agent, or Firm* — Klintworth & Rozenblat IP LLC

(57) ABSTRACT

Apparatus are provided for attaching to a composite tape lamination machine in order to remove composite scrap tape material from a backing paper. When a moveable member is in one position composite non-scrap tape material on a backing paper is directed along a path to avoid a removing member and keep composite non-scrap tape material on a backing paper. When the moveable member is in another position composite scrap tape material on a backing paper is directed along a different path to contact the removing member and remove composite scrap tape material from a backing paper. Composite scrap tape material may be disposed in a scrap disposal member. Backing paper having attached composite non-scrap tape material and not having attached composite scrap tape material may be spooled using a spool roller.

24 Claims, 6 Drawing Sheets

TAPE REMOVAL APPARATUS AND PROCESS FOR USE WITH AN AUTOMATED COMPOSITE TAPE LAYING MACHINE

BACKGROUND

One or more apparatus and methods exist for automatically preparing cassette spools wound with tape material, such as prepeg unidirectional tape, on original backing paper. This tape material may be used to form a laminate. In one existing apparatus/method, tape material on backing paper is unrolled from a supply reel, the tape material is cut into the required configuration, removed from the original backing paper, and then transferred to another release backing paper and wound onto a cassette spool. However, the transferring of the tape material to another backing paper may create problems. The tape material may lose some of its tacking ability, may not align as well on the new backing paper, may not adhere well to the new backing paper, and may have placement problems when placed on a working surface. Further, the new backing paper may tear, may delaminate from the tape, may stretch and/or have tension problems, may form wrinkles when the tape is placed onto a working surface, and/or may not allow good tacking of the tape material onto the working surface. This may cause problems with tape lifting from the working surface, or may cause wrinkles to be formed in the laminate during tape material layup. Moreover, the process of putting the tape material onto a new backing paper may require more than one machine, may increase the costs, may increase the time required, may reduce efficiency, and/or may lead to one or more other problems.

An apparatus, and/or method of removing composite scrap tape material from a backing paper, is needed to decrease one or more problems associated with one or more of the existing apparatus and/or methods.

SUMMARY

In one aspect of the disclosure, an apparatus is disclosed for attaching to a composite tape lamination machine in order to remove composite scrap tape material from a backing paper. The apparatus comprises at least one attachment member for attaching the apparatus to a composite tape lamination machine. The apparatus further comprises at least one removing member for removing composite scrap tape material from a backing paper. The apparatus additionally comprises at least one moveable member. When the moveable member is in one position composite non-scrap tape material on a backing paper is directed along a path to avoid the at least one removing member and keep composite non-scrap tape material on a backing paper. When the moveable member is in another position composite scrap tape material on a backing paper is directed along a different path to contact the at least one removing member and remove composite scrap tape material from a backing paper. The apparatus also comprises a scrap disposal member for disposing of composite scrap tape material which has been removed from a backing paper. The apparatus additionally comprises a spool roller for spooling up backing paper having attached composite non-scrap tape material and not having attached composite scrap tape material.

In another aspect of the disclosure, a method is disclosed of removing composite scrap tape material from a backing paper. In one step, an apparatus is provided comprising at least one attachment member, at least one removing member, at least one moveable member, a scrap disposal member, and a spool roller. In another step, the apparatus is attached to a composite tape lamination machine using the at least one attachment member. In still another step, composite tape material is cut on the backing paper using the composite tape lamination machine. In yet another step, composite non-scrap tape material on the backing paper is moved along one path to avoid contact with the at least one removing member with the at least one moveable member in one position. In an additional step, the composite non-scrap tape material on the backing paper is spooled with the spool roller. In a further step, the at least one moveable member is moved into another position so that the composite scrap tape material contacts the at least one removing member. In yet another step, the composite scrap tape material is removed from the backing paper using the at least one removing member. In an additional step, the composite scrap tape material which has been removed from the backing paper is disposed into the scrap disposal member. In a further step, the backing paper without the composite scrap tape material is spooled with the spool roller.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
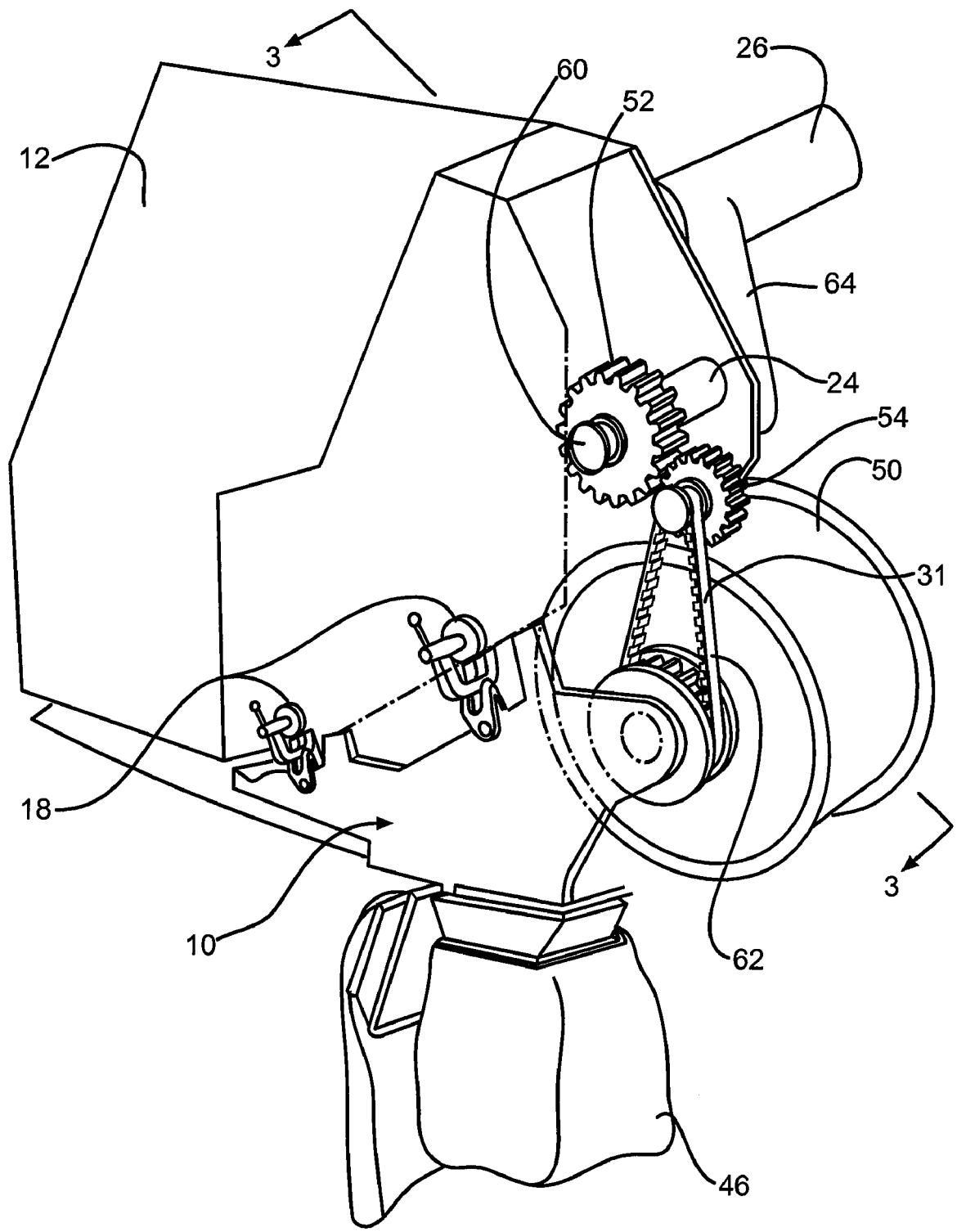
FIG. 1 shows a partial side perspective view of one embodiment of an apparatus attached to a composite tape lamination machine with some inner components of the apparatus exposed.
Figure 2:
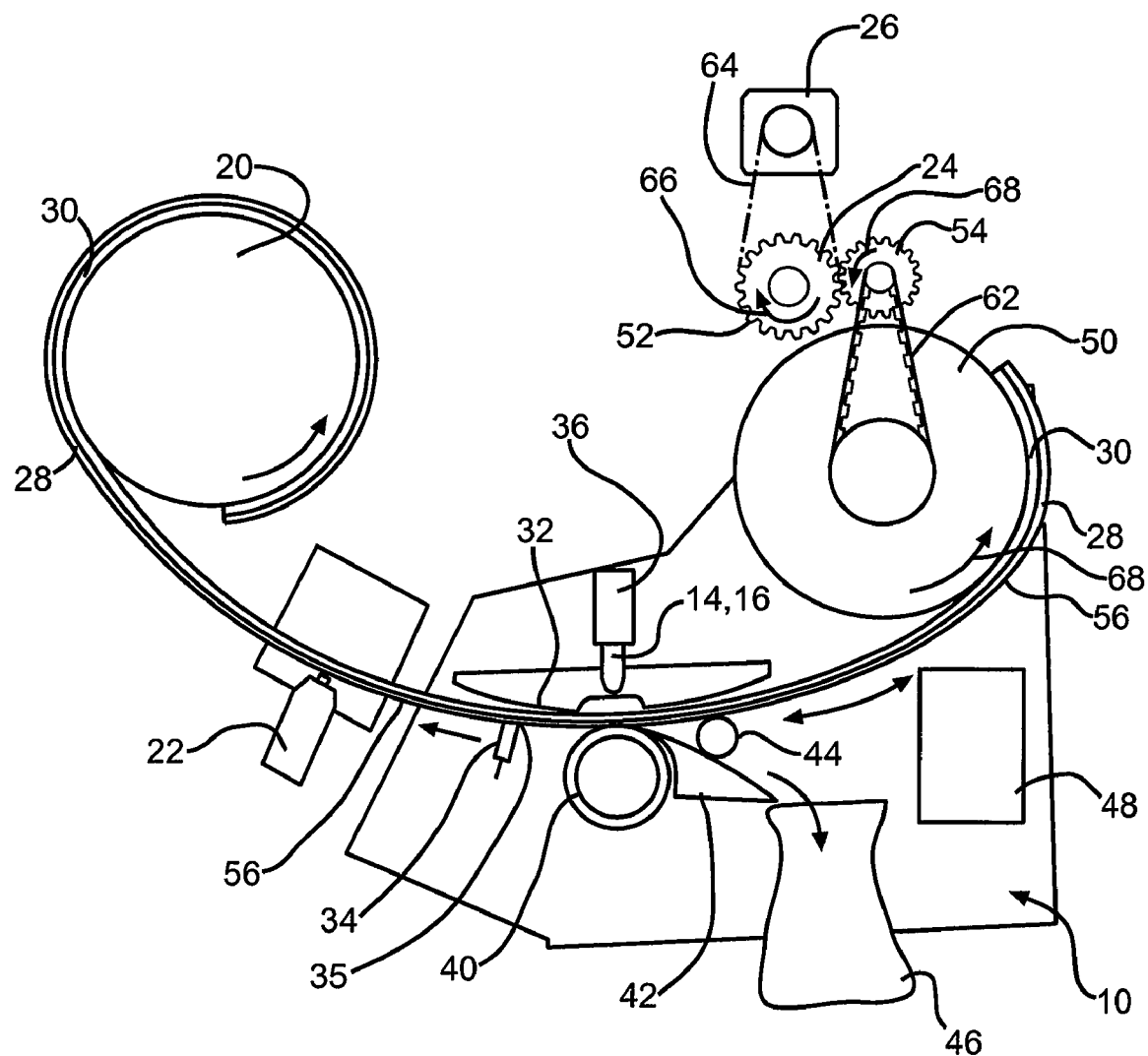
FIG. 2 shows a partial cross-sectional view through line 2-2 of the embodiment of FIG. 1 with one or more moveable members of the apparatus in a raised position, and some of the components of the apparatus and composite tape lamination machine not shown.

FIG. 1 shows a partial side perspective view of one embodiment of an apparatus 10 attached to a composite tape lamination machine 12. Some inner components of the apparatus 10 which would normally be hidden in this view have been shown in order to explain the workings of the apparatus 10. FIG. 2 shows a partial cross-sectional view through line 2-2 of the embodiment of FIG. 1 with one or more moveable members 14 of the apparatus 10 in one raised (or retracted) position 16, and some of the components of the apparatus 10 and composite tape lamination machine 12 not shown in order to explain the workings of the apparatus 10.

As shown in FIGS. 1 and 2, the apparatus 10 may be retro-fitted attached to an existing composite tape lamination machine 12 using one or more attachment members 18. The attachment members 18 may comprise bolts, clamping members, or other types of attachment members. The composite tape lamination machine 12 may comprise a supply spool 20, at least one cutting member 22, a second roll-up spool 24, and a servo-drive 26. The supply spool 20 may supply tape material 28 on backing paper 30 which may be unrolled from the supply spool 20 and pass through the at least one cutting member 22. The tape material 28 may comprise for example and without limitation a composite prepeg (pre-impregnated with resin) unidirectional tape, a graphite, ceramic, a graphite epoxy composite, aramid, glass, or other tape material. The at least one cutting member 22 of the composite tape lamination machine 12 may cut the supplied tape material 28 in a pre-determined configuration while still on the backing paper 30.

The apparatus 10 may comprise the one or more attachment members 18, a radius surface 32, a detection system 34, a pneumatic cylinder 36, one or more moveable members 14, one or more removing members 40, comb member 42, one or more nip rollers 44, scrap disposal member 46, computer 48, spool roller 50, and gear members 52 and 54. After being cut by the at least one cutting member 22, the tape material 28 on backing paper 30 may move along radius surface 32. As the tape material 28 on backing paper 30 moves along the radius surface 32, the detection system 34 may detect at least one of a leading edge and a cut line of the tape material 28 on the backing paper 30. The detection system 34 may comprise at least one of a sensor array 35 and a computer 48. The detection system 34 may utilize an algorithm to detect the leading edge and/or cut line of the tape material 28.

Figure 3:
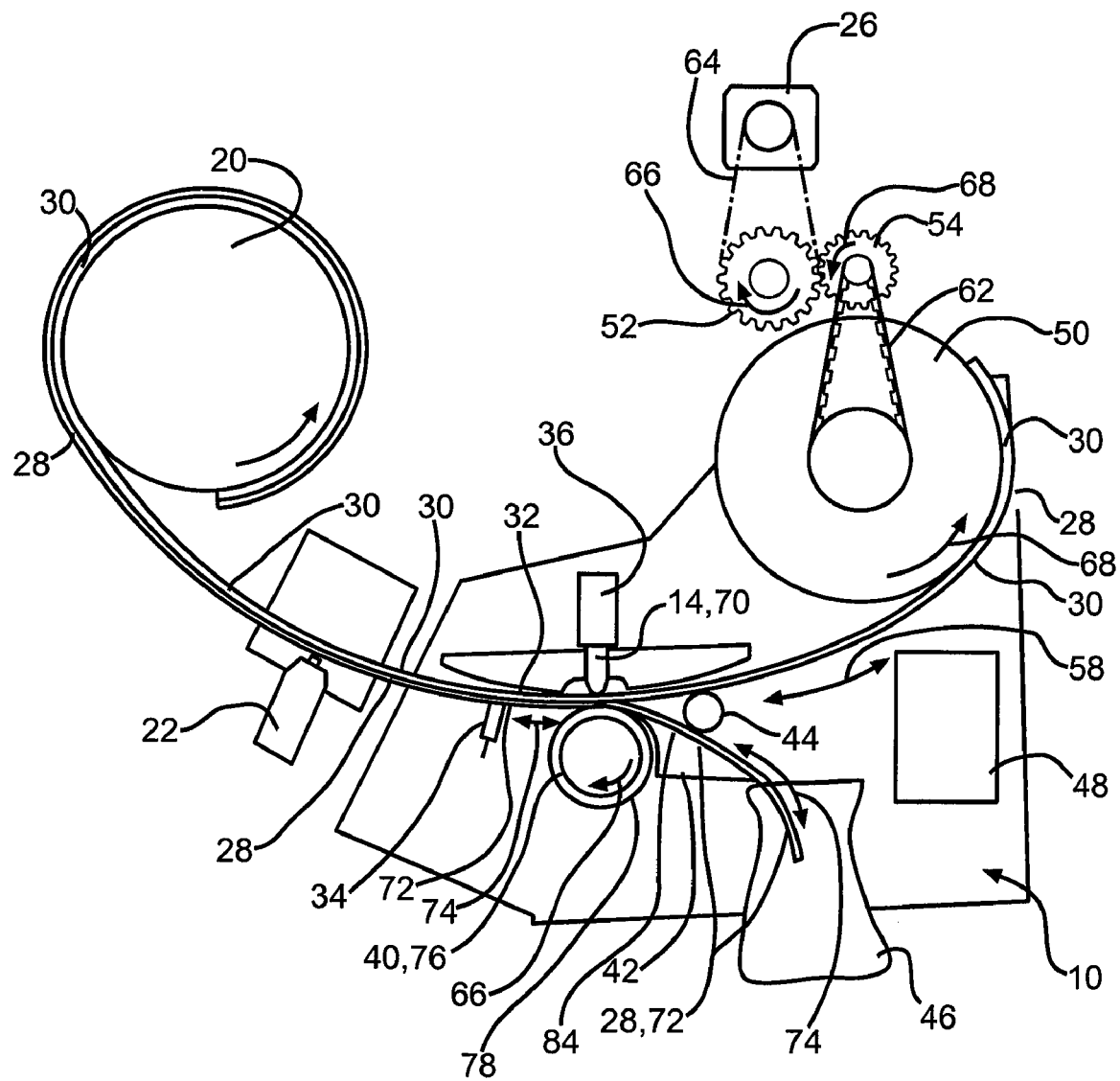
FIG. 3 shows a partial cross-sectional view through line 3-3 of the embodiment of FIG. 1 with the one or more moveable members of the apparatus in another lowered position, and some of the components of the apparatus and composite tape lamination machine not shown.

If the detection system 34 detects that the tape material 28 on the backing paper 30 passing over the radius surface 32 comprises non-scrap tape material 56, the one or more moveable members 14, which may comprise one or more moveable finger members, may be put into one raised (or retracted) position 16 of FIG. 2 using the pneumatic cylinder 36 and/or computer 48. In normal operation, the one or more moveable members 14 may remain in the raised position 16 except when the detection system 34 detects that scrap tape material 72 is passing through as shown in FIG. 3, at which time the moveable members 14 may extend as discussed later herein. When the one or more moveable members 14 are in position 16, the non-scrap tape material 56 on backing paper 30 may be directed along path 58 to avoid the one or more removing members 40 in order to keep the non-scrap tape material 56 on the backing paper 30. Tension may be maintained on the non-scrap tape material 56 on the backing paper 30 at all times due to the non-scrap tape material 56 being wound around spools 20 and 50. The non-scrap tape material 56 on the backing paper 30 may follow path 58 over the radius surface 32 and may then be rolled up by the spool roller 50.

The spool roller 50 may be driven by the gear members 52 and 54. Gear member 52 of the apparatus may be retrofitted attached to the second roll-up spool 24 of the composite tape lamination machine 12 by attaching it to the hub 60 of the second roll-up spool 24. Gear member 54 may be driven by gear member 52. Spool roller 50 of the apparatus 10 may be driven by gear member 54 through belt 62. Servo drive 26 of the composite tape lamination machine 12 may drive second roll-up spool 24 through belt 64. When servo drive 26 drives second roll-up spool 24 in a clockwise direction 66, attached gear member 52 may also be driven in a clockwise direction 66. Gear member 52 may drive gear member 54 in a counter-clockwise direction 68. Gear member 54 may drive spool roller 50 in a counter-clockwise direction 68 which is reversibly driven with respect to the clockwise movement 66 of second roll-up spool 24. In such manner, the spool roller 50 of the apparatus 10 may be reversibly driven by the servo drive 26 of the composite tape lamination machine 12 in order to roll up the non-scrap tape material 56 on backing paper 30 after it has moved over path 58.

FIG. 3 shows a partial cross-sectional view through line 3-3 of the embodiment of FIG. 1 with the one or more moveable members 14 of the apparatus 10 in another lowered (or extended) position 70, and some of the components of the apparatus 10 and composite tape lamination machine 12 not shown in order to explain the workings of the apparatus 10. When the detection system 34 detects that the tape material 28 on the backing paper 30 passing over the radius surface 32 comprises scrap tape material 72, the one or more moveable members 14 may be put into the another lowered (or extended) position 70 of FIG. 3 using the pneumatic cylinder 36 and/or computer 48. When the one or more moveable members 14 are in position 70, the scrap tape material 72 on backing paper 30 may be directed along different path 74 to contact the one or more removing members 40 in order to remove the scrap tape material 72 from the backing paper 30.

When in position 70, the one or more moveable members 14, which may comprise one or moveable finger members, may be disposed near the one or more removing members 40. In such manner, as shown in FIG. 3, the one or more moveable members 14 may abut against the backing paper 30, which may have a smooth low friction surface, to force the scrap tape material 72 moving along path 74 to abut and/or stick against the one or more removing members 40.

Figure 4:
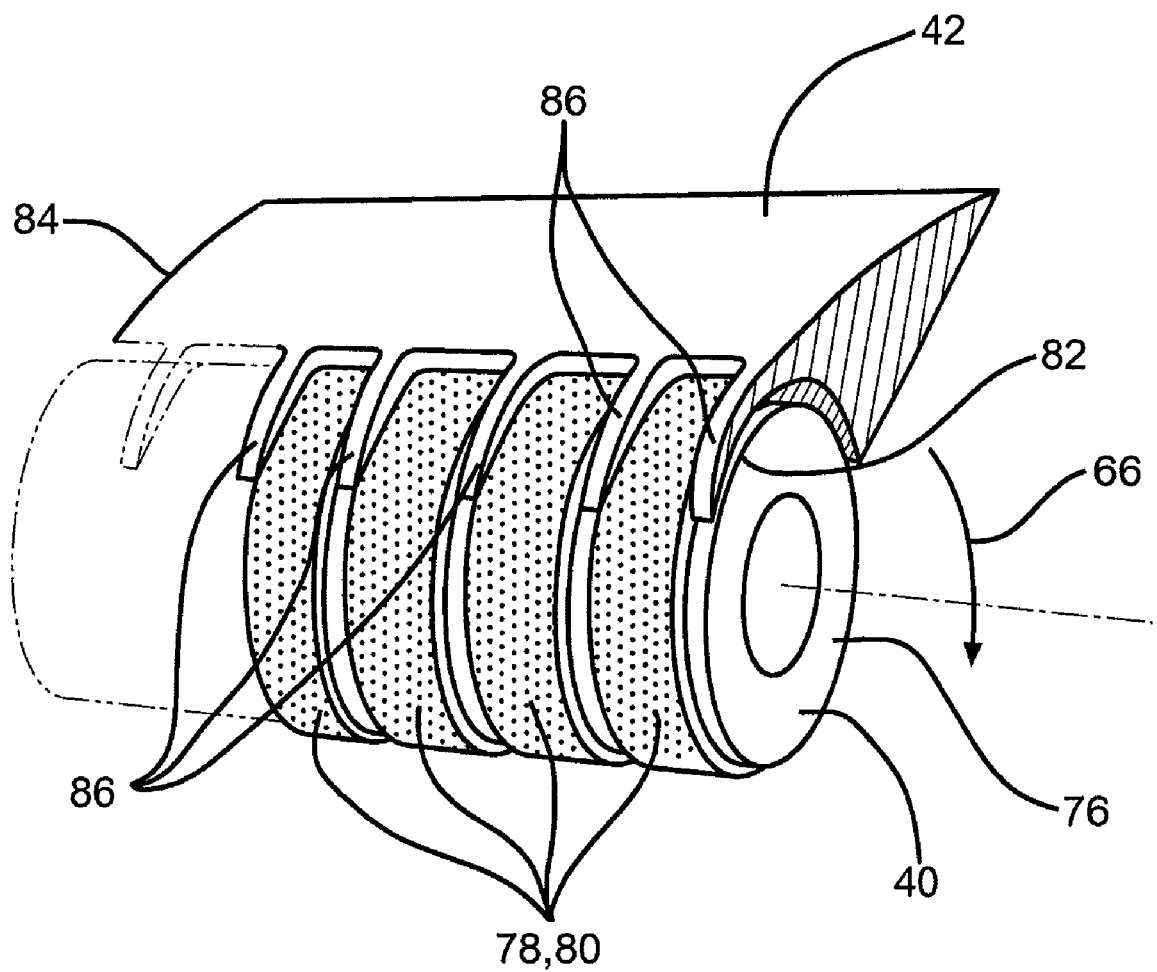
FIG. 4 shows a partial top-side perspective view of only the comb member, high tack roller, and adhesive/tape strips of the apparatus of the embodiment of FIG. 1.

FIG. 4 shows a partial top-side perspective view of only the comb member 42, high tack roller 76, and adhesive/tape strips 78 of the apparatus 10 of the embodiment of FIG. 1. As shown in FIGS. 3 and 4, the one or more removing members 40 may comprise at least one high tack roller 76 which is rotating in clockwise direction 66, and is at least partially covered by a plurality of adhesive and/or tape strips 78 which are rolled around a plurality of spaced apart portions 80 of the high tack roller 76. In other embodiments, one or more adhesive and/or tape strips 78 may be attached to any portion of the high tack roller 76. The adhesive and/or tape strips 78 may be removable from the high tack roller 76 to provide refreshed strips when their tackiness wears out.

The comb member 42 of the apparatus 10 may be disposed over a portion 82 of the high tack roller 76. The comb member 42 may comprise a curved surface 84 and a plurality of spaced apart fingers 86. The plurality of spaced apart fingers 86 may be disposed over the high tack roller 76 with the plurality of adhesive and/or tape strips 78 disposed between the plurality of spaced apart fingers 86.

As shown by viewing FIGS. 3 and 4, when the scrap tape material 72 moving along path 74 contacts the adhesive and/or tape strips 78 of the rotating high tack roller 76, due to the extended moveable members 14 abutting against the backing paper 30, the tackiness of the adhesive and/or tape strips 78 will cause the scrap tape material 72 to stick to the adhesive and/or tape strips 78 and to separate from the backing paper 30 due to the rotation of the high tack roller 76. The separated scrap tape material 72 may then rotate in clockwise direction 66 due to the rotation of the rotating high tack roller 76. As the rotating high tack roller 76 drops below the surface path of the comb member 42, the tack induced adhesion is broken releasing the scrap tape material 72 from the high tack roller 76. The spaced apart fingers 86 of the comb member 42, which may be coated or manufactured from a low friction plastic to reducing sticking of the scrap tape material 72, may then force the separated scrap tape material 72 to move along path 74 along the curved surface 84 of the comb member 42.

The separated scrap tape material 72 may then continue along path 74 between the one or more nip rollers 44 and the curved surface 84 of the comb member 42. The nip rollers 44 may be rotating in a counter-clockwise direction 68 which may force the separated scrap tape material 72 to abut against and continue along the curved surface 84 and into the scrap disposal member 46. In other embodiments, one or more nip rollers 44 may be used as long as the revolutions per minute of the nip rollers 44 is equal to or slightly greater than that of the feed rate of the scrap tape material 72. The scrap disposal member 46 may comprise at least one of a scrap disposal bag and a scrap disposal receptacle for disposing of the scrap tape material 72 which has been removed from the backing paper 30.

The backing paper 30 which has been separated from the scrap tape material 72 may travel along path 58 over the radius surface 32 and may then be rolled up by the spool roller 50 which may be reversibly driven by the servo drive 26 of the composite tape lamination machine 12. In such manner, the spool roller 50 may spool up the backing paper 30 with the scrap tape material 72 removed from the backing paper 30.

By attaching the apparatus 10 to an existing composite tape lamination machine 12, scrap tape material 72 may be removed from backing paper 30 in a less costly, less timely, and/or more timely manner. Use of the apparatus 10 may also reduce one or more other types of problems associated with one or more of the existing composite tape lamination machines.

Figure 5:
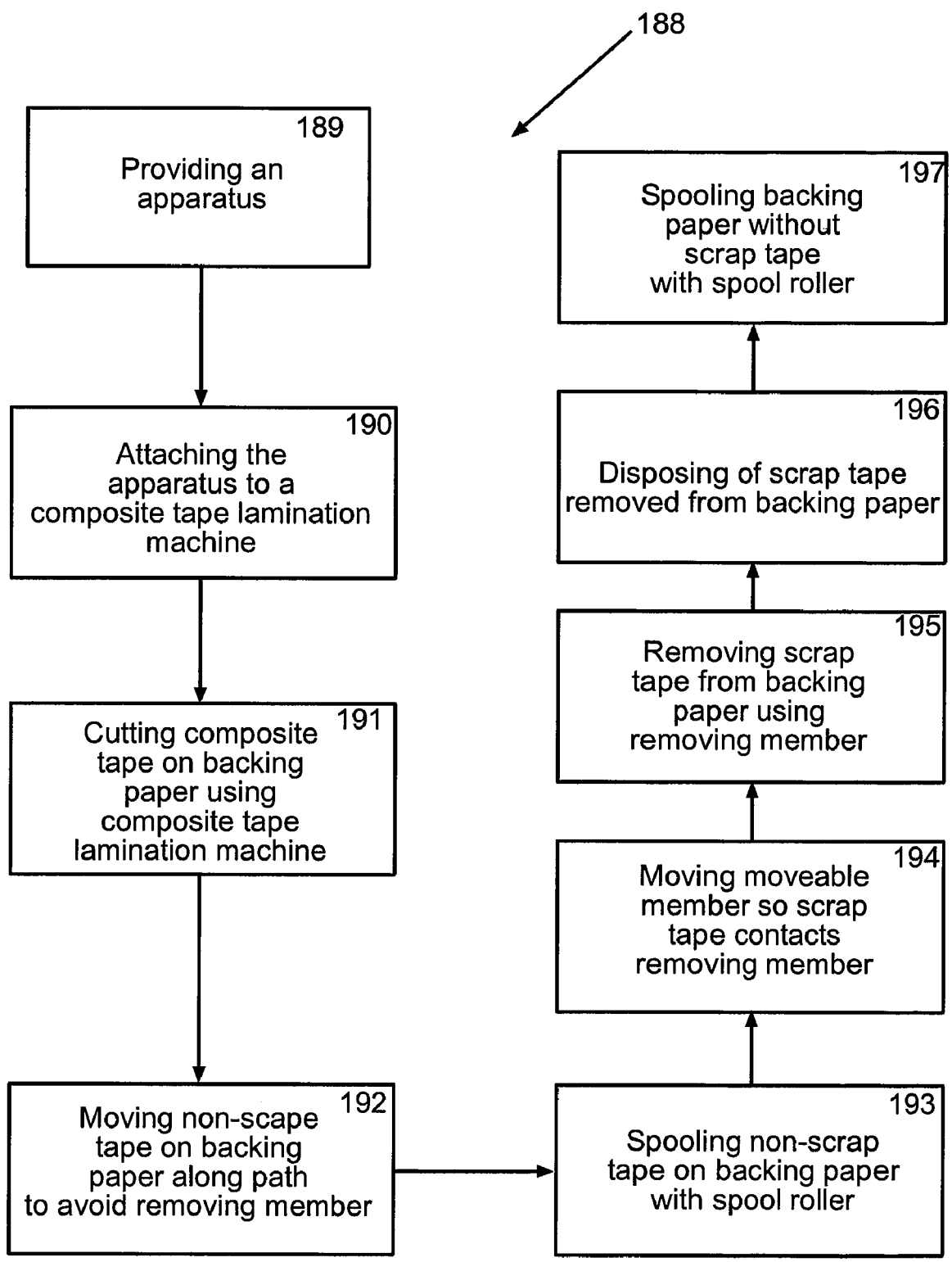
FIG. 5 shows an embodiment of a method of removing composite scrap tape material from backing paper.

FIG. 5 shows a flowchart of one embodiment of a method 188 of removing composite scrap tape material 72 from a backing paper 30. In one step 189, an apparatus 10 is provided comprising at least one attachment member 18, at least one removing member 40, at least one moveable member 14, a scrap disposal member 46, and a spool roller 50. In other embodiments, the apparatus 10, including its components, may comprise any of the embodiments disclosed herein. Moreover, the apparatus 10, including its components, may function in any of the ways herein described.

In another step 190, the apparatus 10 may be attached to a composite tape lamination machine 12 using the at least one attachment member 18. The composite tape lamination machine 12, including its components, may comprise any of the embodiments disclosed herein. Moreover, the composite tape lamination machine 12, including its components, may function in any of the ways herein described. Step 190 may comprise retrofitting the apparatus 10 to the composite tape lamination machine 12 using the at least one attachment member 18. In an additional step 191, composite tape material 28 on the backing paper 30 may be cut using the composite tape lamination machine 12.

In still another step 192, composite non-scrap tape material 56 on the backing paper 30 may be moved along one path 58 to avoid contact with the at least one removing member 40 while the at least one moveable member 14 is in one position 16. While in position 16, the at least one moveable member 14 may be disposed away from the at least one removing member 40. In yet another step 193, the composite non-scrap tape material 56 on the backing paper 30 may be spooled with the spool roller 50.

In step 194, the at least one moveable member 14 may be moved into another position 70 so that the composite scrap tape material 72 contacts the at least one removing member 40. While in position 70, the moveable member 14 may be disposed near the at least one removing member 40. In an additional step 195, the composite scrap tape material 72 is removed from the backing paper 30 using the at least one removing member 40. In yet another step 196, the composite scrap tape material 72 which has been removed from the backing paper 30 is disposed of into the scrap disposal member 46. In still another step 197, the backing paper 30 without the composite scrap tape material 72 is spooled with the spool roller 50.

One or more embodiment of the disclosure may reduce and/or eliminate one or more problems which may have been experienced by one or more of the existing apparatus or methods. For instance, one or more embodiments of the disclosure may reduce the numbers and amounts of backing paper needed, may reduce costs, may reduce the number of machines required, may substantially reduce time since the process may be carried out without transferring cut tape to new backing paper, may lead to less wrinkling and/or tension in the tape material against the backing paper since new backing paper is not required, may improve the adherence of the cut tape to the backing paper since new backing paper is not required, may reduce tacking problems, may reduce problems in transferring tape resin to new backing paper, may improve efficiency, may be less complex, may be more reliable, may be more accurate, may make it less difficult to place tape against working surfaces by providing improved tracking and guidance, may reduce tape lifting from working surfaces, and/or may reduce and/or eliminate one or more other types of problems in one or more of the existing apparatus and/or methods.

Figure 6:
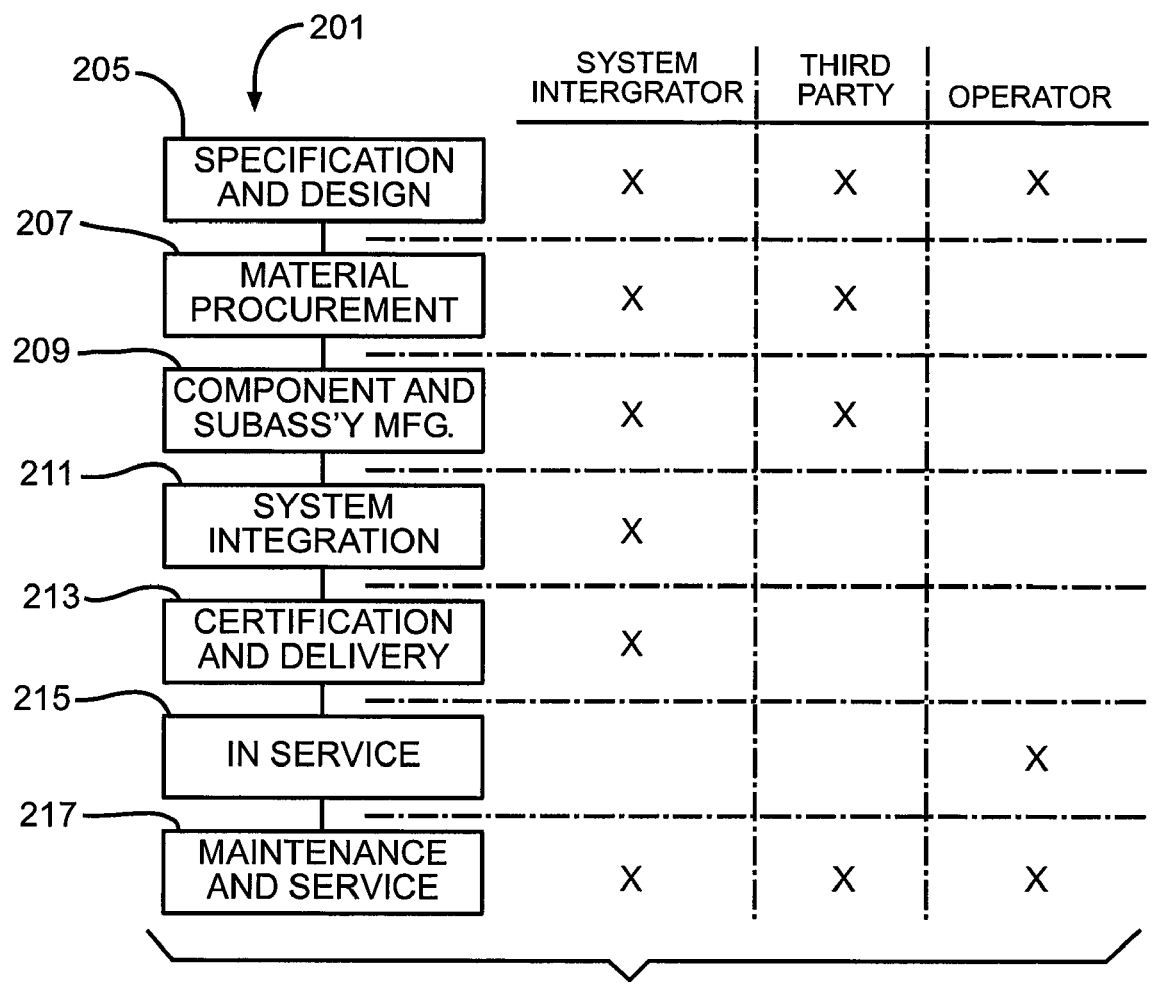
FIG. 6 is a flow diagram of an aircraft production and service methodology.
Figure 7:
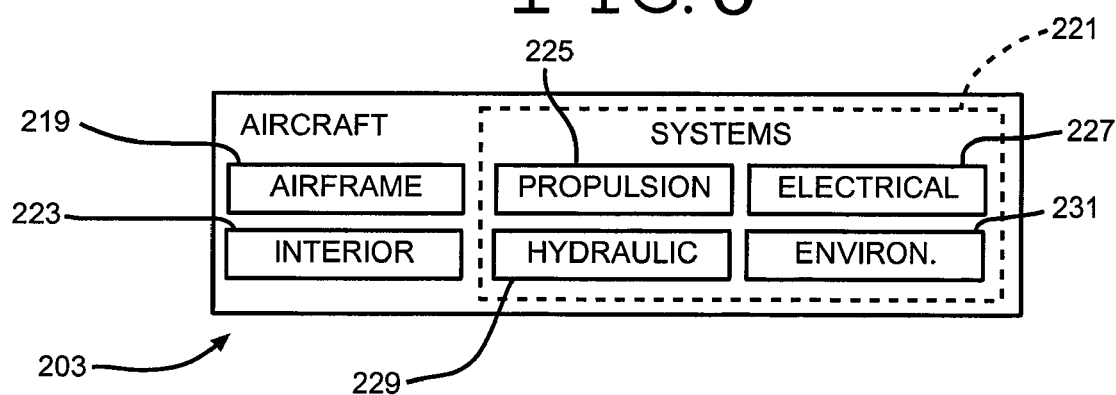
FIG. 7 is a block diagram of an aircraft.

Referring more particularly to the drawings, embodiments of the disclosure may be described in the context of an aircraft manufacturing and service method 201 as shown in FIG. 6 and an aircraft 203 as shown in FIG. 7. During pre-production, exemplary method 201 may include specification and design 205 of the aircraft 203 and material procurement 207. During production, component and subassembly manufacturing 209 and system integration 211 of the aircraft 203 takes place. Thereafter, the aircraft 203 may go through certification and delivery 213 in order to be placed in service 215. While in service by a customer, the aircraft 203 is scheduled for routine maintenance and service 217 (which may also include modification, reconfiguration, refurbishment, and so on).

Each of the processes of method 201 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 203 produced by exemplary method 201 may include an airframe 219 with a plurality of systems 221 and an interior 223. Examples of high-level systems 221 include one or more of a propulsion system 225, an electrical system 227, a hydraulic system 229, and an environmental system 231. Any number of other systems may be included. Although an aerospace example is shown, the principles of the invention may be applied to other industries, such as the automotive industry.

Apparatus and methods embodied herein may be employed during any one or more of the stages of the production and service method 201. For example, components or subassemblies corresponding to production process 209 may be fabricated or manufactured in a manner similar to components or subassemblies produced while the aircraft 203 is in service. Also, one or more apparatus embodiments, method embodiments, or a combination thereof may be utilized during the production stages 209 and 211, for example, by substantially expediting assembly of or reducing the cost of an aircraft 203. Similarly, one or more of apparatus embodiments, method embodiments, or a combination thereof may be utilized while the aircraft 203 is in service, for example and without limitation, to maintenance and service 217.

It should be understood, of course, that the foregoing relates to exemplary embodiments of the disclosure and that modifications may be made without departing from the spirit and scope of the disclosure as set forth in the following claims.

The invention claimed is:

1. A method of removing composite scrap tape material from a backing paper comprising:
    cutting composite tape material on backing paper to form both composite non-scrap tape material on the backing paper and composite scrap tape material on the backing paper;
    abutting a moveable member against the backing paper causing a first portion of the composite scrap tape material to attach to a removing member, and causing a second portion of the composite scrap tape material to be disposed against fingers of a comb member; and
    moving the removing member causing the first and second portions of the composite scrap tape material to peel from the backing paper.

2. The method of claim 1 wherein the moveable member, the comb member, and the removing member are attached to a composite tape lamination machine.

3. The method of claim 2 further comprising unrolling the composite tape material on the backing paper from a supply spool of the composite tape lamination machine, wherein the cutting step is performed by at least one cutting member of the composite tape lamination machine cutting the composite tape material on the backing paper, and further comprising spooling, with a spool roller attached to the composite tape lamination machine, both the backing paper without the composite scrap tape material and the composite non-scrap tape material on the backing paper.

4. The method of claim 1 wherein the abutting step comprises abutting the moveable member against the backing paper causing the first portion of the composite scrap tape material to attach to the removing member disposed between the fingers of the comb member.

5. The method of claim 1 wherein said at least one removing member comprises at least one adhesive roller, and wherein the moving the removing member step comprises rotating the at least one adhesive roller.

6. The method of claim 1 wherein the abutting step comprises abutting the moveable member against the backing paper causing the second portion of the composite scrap tape material to be disposed against the fingers of the comb member apart from the removing member.

7. The method of claim 1 wherein said at least one removing member comprises a plurality of adhesive regions spaced apart between the fingers of the comb member.

8. The method of claim 1 wherein the moving step comprises moving the removing member causing the first portion of the composite scrap tape material to peel from the removing member to be disposed against the comb member apart from the removing member.

9. The method of claim 1 further comprising moving the first and second portions of the composite scrap tape material along a curved surface of the comb member apart from the removing member, wherein the curved surface is attached to the fingers.

10. The method of claim 9 further comprising moving the first and second portions of the composite scrap tape material, while disposed apart from the removing member, between the curved surface and at least one nip roller disposed adjacent to the curved surface.

11. The method of claim 1 wherein the abutting step comprises abutting the moveable member against the backing paper causing the first portion of the composite scrape tape material to attach to the removing member disposed between the fingers of the comb member, and causing the second portion of the composite scrap tape material to be disposed against the fingers of the comb member apart from the removing member, and wherein the moving step comprises moving the removing member causing the first portion of the composite scrap tape material to peel from the removing member to be disposed against the comb member apart from the removing member.

12. The method of claim 1 further comprising moving the moveable member to be disposed apart from the backing paper to avoid the composite non-scrap tape material from being removed from the backing paper by the removing member.

13. The method of claim 1 wherein said moveable member comprises a finger member, wherein during the abutting step the finger member of the moveable member moves between the fingers of the comb member.

14. The method of claim 1 wherein said moveable member comprises a plurality of finger members, and wherein during the abutting step the finger members of the moveable member move between the fingers of the comb member.

15. The method of claim 1 further comprising disposing the composite scrap tape material, which has been peeled from the backing paper, into a scrap disposal member.

16. The method of claim 1 further comprising spooling, with a spool roller, both the backing paper without the composite scrap tape material and the composite non-scrap tape material on the backing paper.

17. The method of claim 2 further comprising a drive member of the composite tape lamination machine driving a spool roller, using a plurality of gear members to spool with the spool roller both the backing paper without the composite scrap tape material and the composite non-scrap tape material on the backing paper.

18. The method of claim 1 further comprising detecting, using a detection system, at least one of a leading edge or a cut line of the composite tape material on the backing paper.

19. The method of claim 18 wherein the detection system comprises at least one of a sensor array or a computer.

20. The method of claim 1 further comprising moving the composite tape material on the backing paper along a curved radius surface disposed adjacent to the moveable member.

21. A method of removing composite scrap tape material from a backing paper comprising:

abutting a moveable member against backing paper that is attached to composite scrap tape material causing a first portion of the composite scrap tape material to attach to a removing member disposed between fingers of a comb member, and causing a second portion of the composite scrap tape material to be disposed against the fingers of the comb member apart from the removing member; and moving the removing member causing the first and second portions of the composite scrap tape material to peel from the backing paper, and causing the first portion of the composite scrap tape material to peel from the removing member.

22. The method of claim 21 wherein the moveable member comprises a plurality of finger members, and wherein the abutting step further comprises moving the plurality of finger members between the fingers of the comb member.

23. The method of claim 21 wherein the removing member comprises a roller, and wherein the moving step further comprises rotating the roller.

24. The method of claim 21 further comprising moving the first and second portions of the composite scrap tape material, while disposed apart from the removing member, along a curved surface of the comb member attached to the fingers.

* * * * *